UNITED STATES PATENT OFFICE.

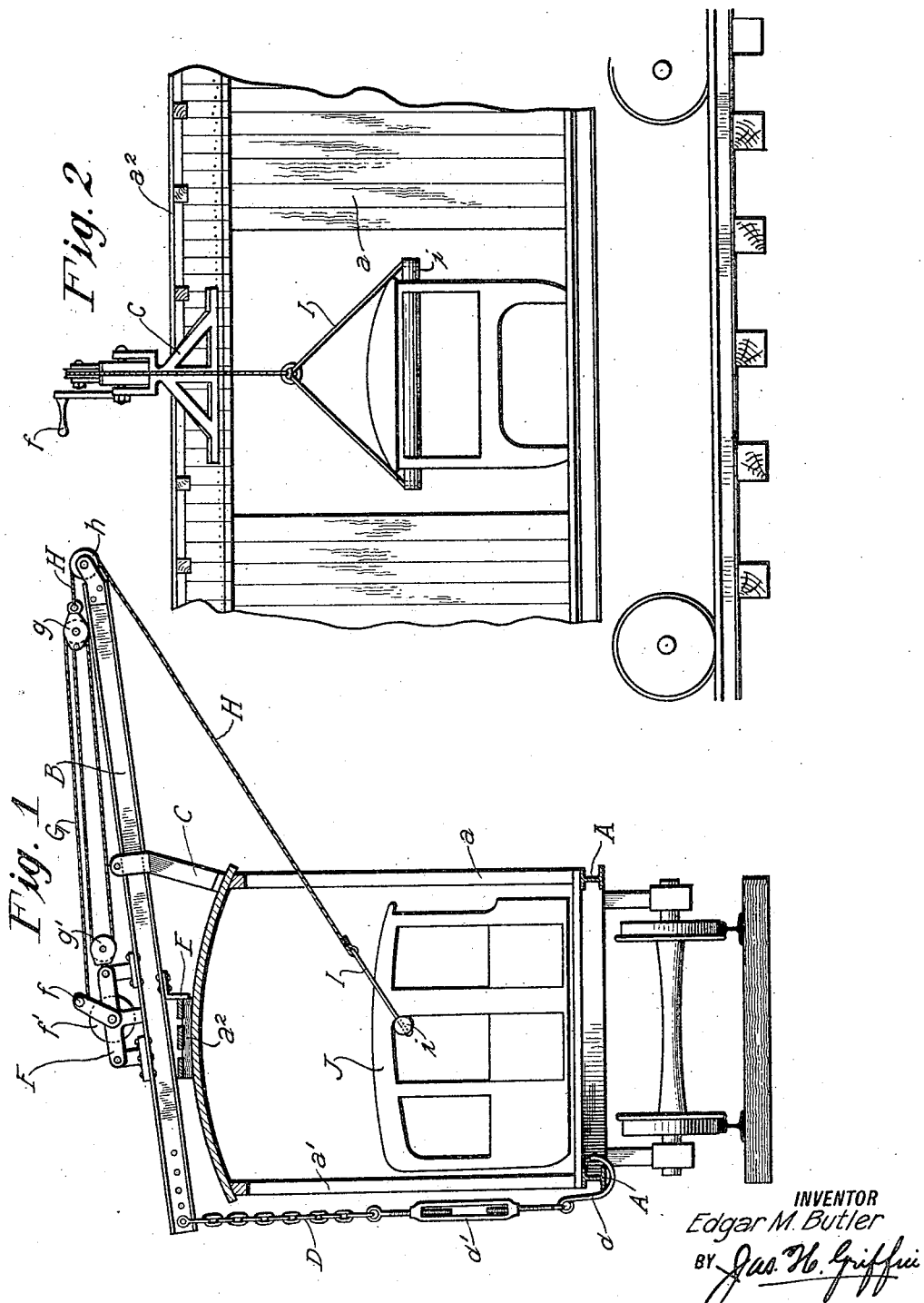

EDGAR M. BUTLER, OF BROOKLYN, NEW YORK.

FREIGHT-CAR-UNLOADING DEVICE.

1,402,475.     Specification of Letters Patent.     Patented Jan. 3, 1922.

Application filed October 7, 1920. Serial No. 415,237.

*To all whom it may concern:*

Be it known that I, EDGAR M. BUTLER, a citizen of the United States, residing at New York city, borough of Brooklyn, in the county of Kings and State of New York, have invented a certain new and useful Freight-Car-Unloading Device, of which the following is a specification.

This invention is a freight car unloading device adapted for use in removing heavy or bulky articles, more particularly, from box cars.

The object of the invention is to provide simple and efficient means which may be readily detachably associated with a freight car and as easily and expeditiously removed therefrom when the work of unloading is finished.

A further object of the invention is to provide a device of this character which may be mounted in place on the car without necessitating the employment of bolts, screws, nails or other similar attaching means, which would mar the car, or, if attached to the roof thereof, would leave holes which would result in occasioning leaks in the roof.

It is the practice of shippers who wish to transport by freight articles, in such manner as to protect them against weather during transportation, in closed box cars, and while it is a relatively easy matter to move heavy bodies of this character about the interior of the car, it is frequently quite difficult to remove them from the car, due, more particularly, to the restricted size of the door opening of the car, which necessitates workmen operating in cramped or restricted space. This is particularly true in the shipping of automobile bodies, chassis, or other bulky articles of considerable weight.

The present invention is aimed to move bulky or heavy articles from a point adjacent the door and interiorly of the car through the door and to a point exteriorly thereof in a simple and convenient manner.

In the preferred manner of carrying out the present invention, the device embodies a beam adapted to be supported on the top of the car and detachably secured to the car in such position that the beam will extend transversely thereof and project beyond the side of the car and substantially over the center of the doorway. Adjacent the outer end of the door is positioned a suitable directional sheave and also supported upon the door or otherwise suitably associated therewith is any suitable conventional form of winch, from which a line may be passed over the directional sheave and secured to the article to be removed from the car. When the winch is operated to wind up the line, the article within the car is drawn forwardly and through the doorway to a point exterior of the car.

Features of the invention, other than those specified, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 1 is a transverse elevation through a box car showing the present invention associated with the car and in the operation of removing an article from said car; and, Figure 2 is a side elevation of the central portion of the car with the device of the present invention placed thereon and as viewed from the right hand side of Figure 1.

In the drawings, A designates a box car provided with the side door openings $a$ and $a'$, and having the usual brakeman's running board $a^2$ extending along the center of the roof thereof. The car shown in the drawings is of the conventional type commonly used for the transportation of freight.

The device of the present invention, in the preferred form shown, embodies a beam B of a length greater than the width of the car and formed from metal or wood either in the form of the simple I-beam construction illustrated, or of a truss construction, if preferred. The beam is provided intermediate its ends with a depending step C adapted to rest on the roof of the car adjacent the edge thereof, after the manner shown in Figure 1 and this step is preferably broadened out at its base to render it of sufficient length to bridge a plurality of the rafters of the car, so as to properly distribute the weight imposed thereon.

The in-board end of the beam B is adapted to be anchored, so as to preclude tilting of the beam B on the step C as a fulcrum, by suitable clamping means, shown in the drawings, as consisting of a chain D secured at its upper end by a shackle to the beam B and provided at its lower end with a hook d adapted to engage beneath one of the sills of the car. The chain D includes a turn buckle d', by means of which the chain may be placed under tension to draw the in-board portion of the beam tightly against the top of the car and preclude lost motion in the construction during operation.

In practice, the chain may be in the form of a rigid rod or of a cable and the anchoring means need not necessarily engage with the sill of the car, since, if desired, it might well be made shorter and engage with the top edge of the door opening a'. Moreover, the means for anchoring the in-board end of the beam may be otherwise varied without departing from this invention, the essential consideration being that it is anchored.

The foregoing arrangement is such that the beam may be readily lifted into position on top of the car and anchored in place in the manner described, so as to so position the beam that its out-board end will project an appreciable distance beyond the side of the car as shown in Figure 1, and will be capable of withstanding the application of considerable force in a downward direction. Longitudinal sliding movement of the beam in an in-board direction is precluded by providing the beam on its under side with a stop E adapted to engage with one lateral edge of the running board $a^2$.

Preferably mounted upon the beam B is a winch F of any suitable construction, here shown as manually operable through actuation of a crank f. The handle f, when actuated, is adapted to operate a drum f' which constitutes a take up means for a line or cable G and is adapted to be passed one or more times about power multiplying blocks g and g' and secured at its end to one of them. To the blocks g is secured one end of a line or cable H which passes about a sheave h, mounted at the out-board end of the beam B, and may be carried in a rearward direction and through the door opening a of the car to be secured by any suitable means to the article to be removed from the car.

For the purpose of illustration, I have shown this article in the drawings as an automobile body J and said means of attachment may conveniently embody a sling I adapted to be secured to a bar i passed through the body J as shown best in Figure 2.

When the device is mounted in the manner described and the line H secured to the body J, the operation of the winch will obviously result in the removal of the body J from the car on a truck or platform positioned in front of the doorway thereof. If a plurality of car bodies are positioned in the freight car, these bodies may be moved in succession into position before the doorway and successively removed in the manner specified. When all of the bodies have been removed, the device of the present invention may be readily demounted by merely loosening the turn buckle d', unhooking the hook d and lifting the device down from the car.

It will be apparent from the foregoing description that the unloading device described is extremely simple in construction and may be demountably positioned on a car without in anywise marring the car or without the necessity of any permanent attachments thereon. In practice, one chain D or other form of anchoring means is usually found sufficient, but, if desired, two chains may be brought down from the in-board end of the door in divergent relation and clamped at a distance from one another to the sill of the car. The advantage of this latter construction is that the in-board end of the bar will be positively secured against lateral movement and swaying of the out-board end of said bar cannot occur.

In the preferred construction of the invention, the winch F is mounted upon the bar, but it is entirely within the spirit of this invention to mount this winch in other positions, from that shown, or to allow the same to rest upon the ground or on the platform exteriorly of the car door, or to clamp the winch to suitable clamping means directed to the car. For these reasons, the modifications referred to, as well as the substitution of equivalents may be availed of without departing from the spirit of this invention which is to be understood as broadly novel as is commensurate with the appended claims.

Having thus fully described the invention, what I claim as new and desire to secure by Letters Patent is:

1. A device for unloading freight cars embodying a beam adapted to be positioned transversely of a box car on the roof of the same and of such length as to project beyond one side of the car, means for anchoring the in-board end of the beam to the car, a sheave at the out-board end of the beam, a winch mounted on the beam intermediate its ends and a line cooperating with the winch, passing over the sheave and adapted to be passed through the door opening of a freight car and be secured to an object positioned within the car for the purpose of effecting removal of such object from the car when the winch is operated.

2. A device for unloading freight cars embodying a beam adapted to be positioned transversely of a box car and on the roof of the same, said beam being of such length as to project beyond one side of the door, a step associated with the beam intermediate its ends and adapted to rest on the roof of the car, means for anchoring the in-board end of the beam to preclude tilting of the beam on the step when weight is applied to the out-board end of the beam, a winch mounted on the beam and a line passing from the winch to the out-board end of the beam and thence in a rearward direction through the door opening of a car and adapted to be secured to an article in the car, whereby operation of the winch effects the removal of such article from the car.

3. A device for unloading freight cars embodying a beam adapted to be positioned transversely of a box car and on the roof of the same, said beam being of such length as to project beyond one side of the door, a step associated with the beam intermediate its ends and adapted to rest on the roof of the car, a stop associated with the beam and adapted to rest against one edge of the brakeman's running board of the car, means for anchoring the in-board end of the beam to the car to preclude tilting of the beam on the step, a winch mounted on the beam, a sheave at the out-board end of said beam and a line associated with the winch and passing over the sheave, said line being adapted to be passed through the door opening of the car and secured to an object positioned therein, whereby when the winch is operated, the object is removed from the car.

4. A device for unloading freight cars embodying a beam adapted to be positioned transversely of a box car and on the roof of the same, said beam being of such length as to project beyond one side of the door, means for anchoring the in-board end of the beam to the car to preclude tilting of the beam when a load is applied to the out-board end thereof, a sheave associated with the out-board end, and a line passed over the sheave and adapted to be secured to an object positioned within the car, whereby, when power is applied to the line, the object is withdrawn from the car.

5. A device for unloading freight cars embodying a beam adapted to be positioned transversely of a box car and on the roof of the same, said beam being of such length as to project beyond one side of the door, means for anchoring the in-board end of the beam to the car to preclude tilting of the beam when weight is applied to the out-board end thereof, a sheave mounted at the out-board end of the beam, a line passed over said sheave and power means for operating said line, whereby the line is adapted to be passed through the door opening of the car and secured to an object positioned within the car for the purpose of removing such object from the car.

6. A device for unloading freight cars embodying a beam adapted to be positioned transversely of a box car and on the roof of the same, said beam being of such length as to project beyond one side of the door, a step associated with the beam intermediate its ends and adapted to rest on the roof of the car adjacent the side of the car at which the unloading is desired, means for tying down the in-board end of the beam to the opposite side of the car, a sheave at the out-board end of the beam, a winch and a line passing from the winch over the sheave and adapted to be successively secured to objects interiorly of the car to effect freight unloading when the winch is operated.

7. A device for unloading freight cars embodying a beam adapted to be positioned transversely of a box car and on the roof of the same, said beam being of such length as to project beyond one side of the door, means for anchoring the in-board end of the beam to the car, a sheave at the out-board end of the beam and a line passing over the roof and adapted to be secured to articles interiorly of the car for the purpose of effecting the unolading of such articles when power is applied to the line, said device being secured to the car only by the anchoring means at the in-board end of the beam, whereby the device may be removed when the anchoring means is loosened.

In testimony whereof, I have signed my name to this specification.

EDGAR M. BUTLER.